US007416451B2

United States Patent
Tanaka et al.

(10) Patent No.: US 7,416,451 B2
(45) Date of Patent: Aug. 26, 2008

(54) CARD ADAPTER

(75) Inventors: Akihiro Tanaka, Yao (JP); Yasuo Nakai, Yao (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 12/001,785

(22) Filed: Dec. 12, 2007

(65) Prior Publication Data

US 2008/0153358 A1 Jun. 26, 2008

(30) Foreign Application Priority Data

Dec. 15, 2006 (JP) ............................. 2006-338492

(51) Int. Cl.
*H01R 24/00* (2006.01)
(52) U.S. Cl. ...................... 439/630; 439/945
(58) Field of Classification Search ................ 439/630, 439/945, 946
See application file for complete search history.

(56) References Cited

U.S. PATENT DOCUMENTS 7,033,223 B1 * 4/2006 Lin ............................. 439/630
7,320,622 B2 * 1/2008 Ying et al. ................... 439/630
7,357,677 B2 * 4/2008 Liu ............................. 439/630
2006/0124739 A1 6/2006 Kojima et al.

FOREIGN PATENT DOCUMENTS

JP 2004145676 5/2004

* cited by examiner

*Primary Examiner*—Tho D Ta
(74) *Attorney, Agent, or Firm*—The Webb Law Firm (57) ABSTRACT

A card adapter comprises a main body (50) having an insertion slot (51) into which a memory card (M) is inserted; a first contact member (10) having first contact points (11) for contacting a first array of electrodes (M1) and first connecting portions (12) to be connected to a connector with base portions (13) located between the first contact points (11) and the first connecting portions (12); a second contact member (20) having second contact points (21) for contacting a second array of electrodes (M2) and second connecting portions (22) to be connected to a connector with base portions (23) located between the second contact points (21) and the second connecting portions (22); the first contact member (10) and the second contact member (20) being arranged within the main body (50) in such a way that the first contact points (11) and the second contact points (21) are located at different positions in a direction to which the memory card (M) is inserted.

5 Claims, 9 Drawing Sheets

CARD ADAPTER

CROSS REFERENCE TO RELATED APPLICATIONS

Priority based on JP2006-338492, which was filed by the applicant on Dec. 15, 2006 in Japan is claimed in this application, and the entire application is incorporated by reference in this application.

THE BACKGROUND OF THE INVENTION

1. The Field of the Invention

The present invention relates to a card adapter used for connecting a memory card to a connector for other memory cards.

2. Description of Related Art

For instance, storing image data taken by digital cameras and music data downloaded from music distribution sites onto memory cards as a recording medium for utilizing them with a variety of electronic devices is becoming part of everyday life. Many types of memory cards with different sizes and construction are sold in the market. However, an electronic device can only accept a memory card complying with a particular standard, for example, a memory card compatible with the connector of the electronic device. Therefore, an electronic device may not accept different standard memory cards as they are. A card adapter for connecting a memory card to an electronic device has been developed with which an electronic device utilizing a memory card complying with a particular standard can accept other standard memory cards (See, for example, JP Laid-open Patent Publication No. 2004-145676).

The card adapter disclosed in the above patent publication is used for connecting a compact memory card to a connector for larger memory cards. The card adapter comprises an array of contact members disposed in a width direction within the main body for contacting electrodes of the compact memory card to be inserted into the card adapter. That is, the card adapter described in the patent document is used for a compact memory card with an array of electrodes arranged in a width direction.

In recent years, electronic devices are becoming smaller and thinner, and following this trend, smaller memory cards, for example a mini SD card, micro SD card, etc. are introduced to the market. In particular, an extremely compact memory card such as a micro SD card has a new construction which is different from those of conventional memory cards. For instance, a memory card, such as a micro SD memory card with a RF terminal, having the second electrode array in addition to a conventional electrode array disposed in a width direction can be considered. The RF terminal is an electrode for transferring information without any contact.

Therefore, the new type of memory card having two arrays of electrodes can not be used in a card adapter with one array of contact member disposed in a width direction within its main body, such as that described in the patent document. Then, if a user-owned electronic device doses not comprise any connectors supporting a memory card having two arrays of electrodes, the user can not use the memory card having two arrays of electrodes.

SUMMARY OF THE INVENTION

In view of above problems, an object of the present invention is to provide a card adapter for enabling a memory card with two arrays of electrodes arranged in a direction to which a memory card is inserted, to be connected to an electronic device having no connectors for the memory card.

A card adapter for connecting a memory card having first and second arrays of electrodes to a connector supporting memory cards which are different from the memory card in accordance with the characterizing structure of the present invention comprises a main body having an insertion slot into which the memory card is inserted; a first contact member comprising first contact points for contacting the first electrode array and first connecting portions to be connected to the connector with base portions disposed between the first contact points and the first connecting portions; a second contact member comprising second contact points for contacting the second electrode array and second connecting portions to be connected to the connector with base portions disposed between the second contact points and the second connecting portions, wherein the first contact member and the second contact member are arranged within the main body in such a way that the first contact points and the second contact points are located at different positions in a direction in which the memory card is inserted.

The card adapter of the present structure consists of two groups, the first contact member and the second contact member in contrast to the conventional structure with only one group of contact member. The first and second contact member are disposed within the main body in such a way that the first contact points of the first contact member and the second contact points of the second contact member are located at different positions in a direction to which a memory card is inserted. Therefore, when using the memory card inserted into the card adapter of the present structure, even the memory card having two arrays of electrodes can reliably contact electronic devices comprising no connectors supporting the memory card.

As mentioned above, the card adapter of the present structure enables the use of memory cards having two arrays of electrodes. It also allows the memory cards to be made smaller. The versatility of electronic devices is also improved.

In the card adapter in accordance with the invention, it is preferred that the base portions of the first contact members and second contact members are located at different positions in a direction of thickness of the main body.

In the card adapter of the present structure, as the base portions of the first contact member and the base portions of the second contact member are located at different positions in a direction of thickness of the main body, the first contact points of the first contact member and the second contact points of the second contact member can be located at different predetermined positions respectively while the first contact member and the second contact member can be insulated from each other. In addition the base portions of the first and second contact member do not exist in a common flat surface; therefore, the two dimensional spread of two contact member can be reduced as well as the occupied area of the main body. The base portions of the first contact member and the base portions of the second contact member partially overlap as they are located at different positions in a direction of thickness. The base portions of the first and second contact member are much thinner than the main body; therefore, the thickness of the card adapter does not increase.

In the card adapter in accordance with the invention, it is preferred that the first contact member and the second contact member are embedded into the first insulator and the second insulator respectively by insertion molding, and the first insulator and the second insulator are assembled to be integrated.

In the card adapter in accordance with the present structure, the first and second contact members are embedded into the first and second insulators by insertion molding; therefore, the first and second contact members are insulated more reliably. Since the first insulator in which the first contact member is embedded and the second insulator in which the second contact member is embedded are integrated, the rigidity (strength) of the contact member increases and the durability of the card adapter is improved. The toughness of the card adapter is also improved as the distortion of the insulators is reduced compared to the insulators that are not integrated. As the integration allows the first and second insulators to be treated as one part, insulator testing, such as conduction and compression testing can be conducted at once. This enables the efficiency in manufacturing card adapters to be improved.

In the card adapter in accordance with the invention, it is preferred that a convex portion formed in the second insulator is fit into a hole portion formed in the first insulator to integrate the first insulator and the second insulator wherein the first connecting portions and the second connecting portions lie in a common flat surface.

In the card adapter of the present structure, the first and second insulators can be easily assembled as they can be integrated simply by fitting the convex portion formed in the second insulator into the hole portion formed in the first insulator. With the insulators integrated, the first connecting portions of the first contact member and the second connecting portions of the second contact member lie in a common flat surface; therefore, the card adapter with the memory card inserted can be connected into a connector of an electronic device smoothly and reliably.

In the card adapter of the invention, it is preferred that the main body comprises a metal case, which functions as a ground member of the memory card.

In the card adapter of the present structure, there is no floating ground member as the metal case of the main body functions as a ground member of the memory card. This results in a more compact, thinner and lightweight card adapter as well as a card adapter with a simple appearance. By providing the main body with the metal case, the memory card is electromagnetically shielded from an electronic device which is on the outside of the card adapter. This prevents electromagnetic waves from leaking from the memory card. The memory card is less affected by external electromagnetic waves as the metal case shields external electromagnetic waves.

DETAILED DESCRIPTION OF THE INVENTION

An embodiment of the present invention is described hereinafter with reference to the figures. The invention is not limited to the following embodiment and constructions described in the figures, and include equivalents thereof.

Figure 3:
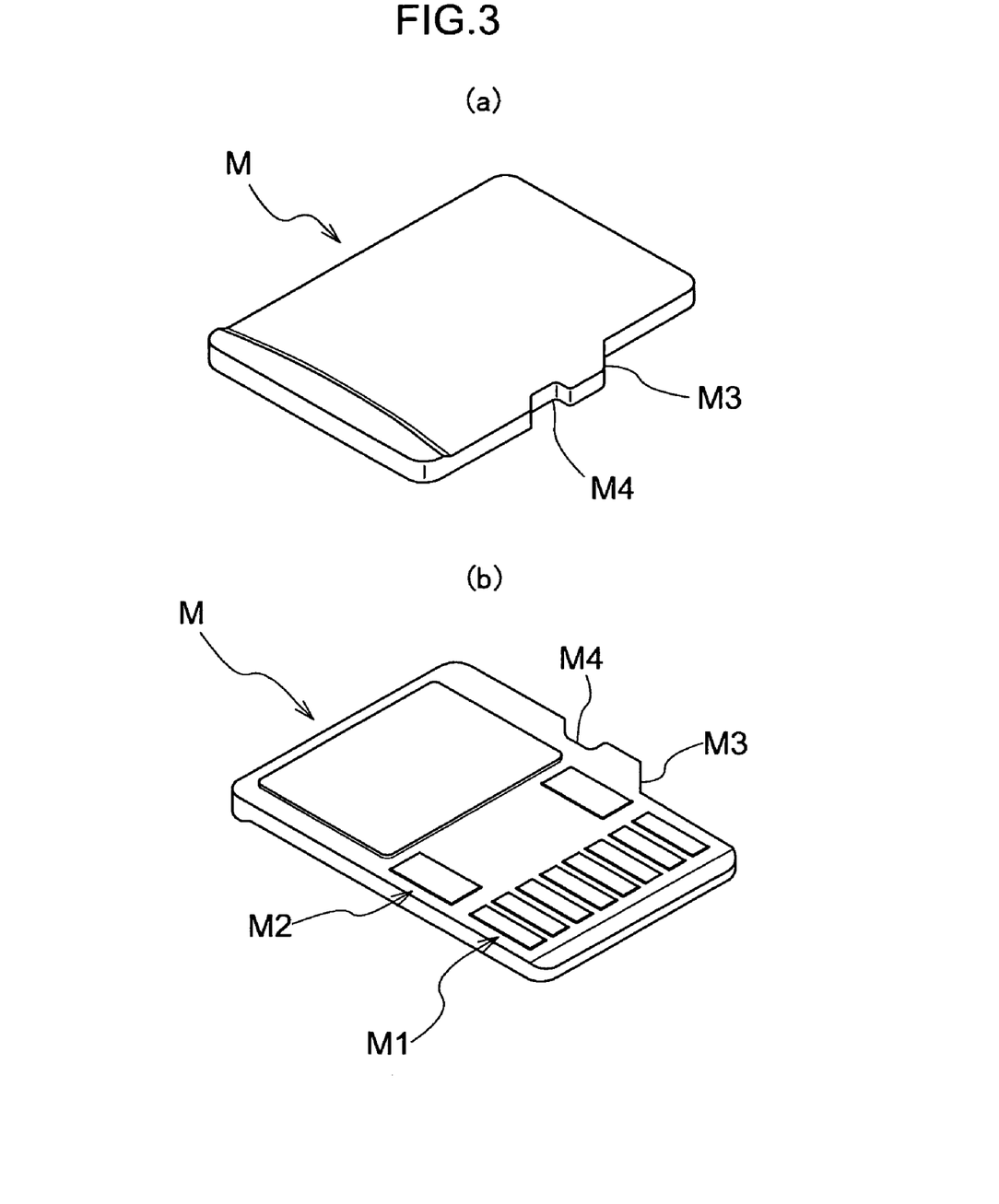
FIGS. 3(a) and 3(b) are perspective views of a memory card to be inserted into the card adapter.

A card adapter 100 is used for connecting a memory card M having the first electrode array M1 and the second electrode array M2 shown in FIG. 3, to connectors (not shown) provided in electronic devices (not shown) for other memory cards which are different from the memory card M. The present invention can be applied to any combination of the memory card M and a connector of electronic devices.

Figure 1:
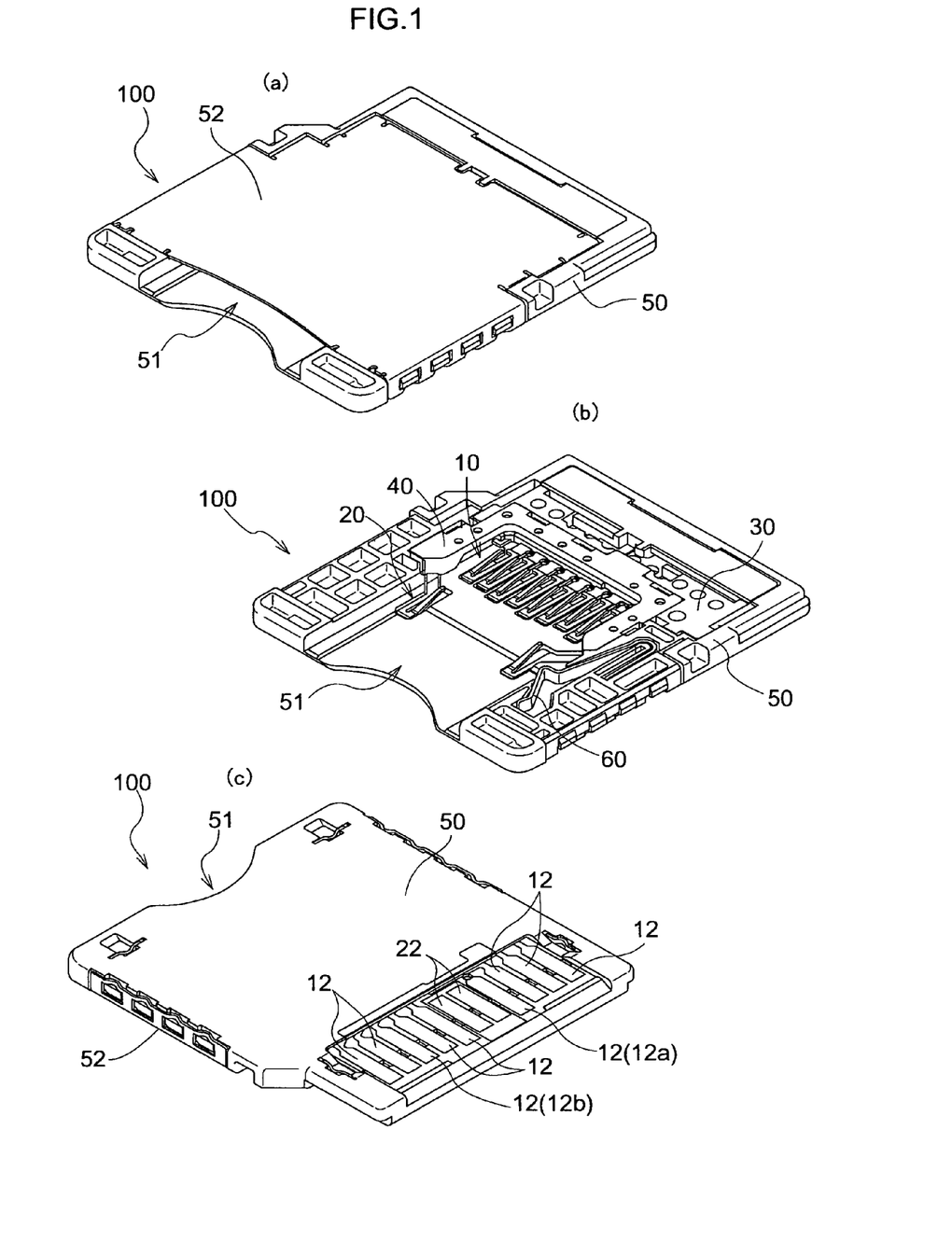
FIGS. 1(a)-1(c) are perspective views of the card adapter of one embodiment of the present invention.
Figure 4:
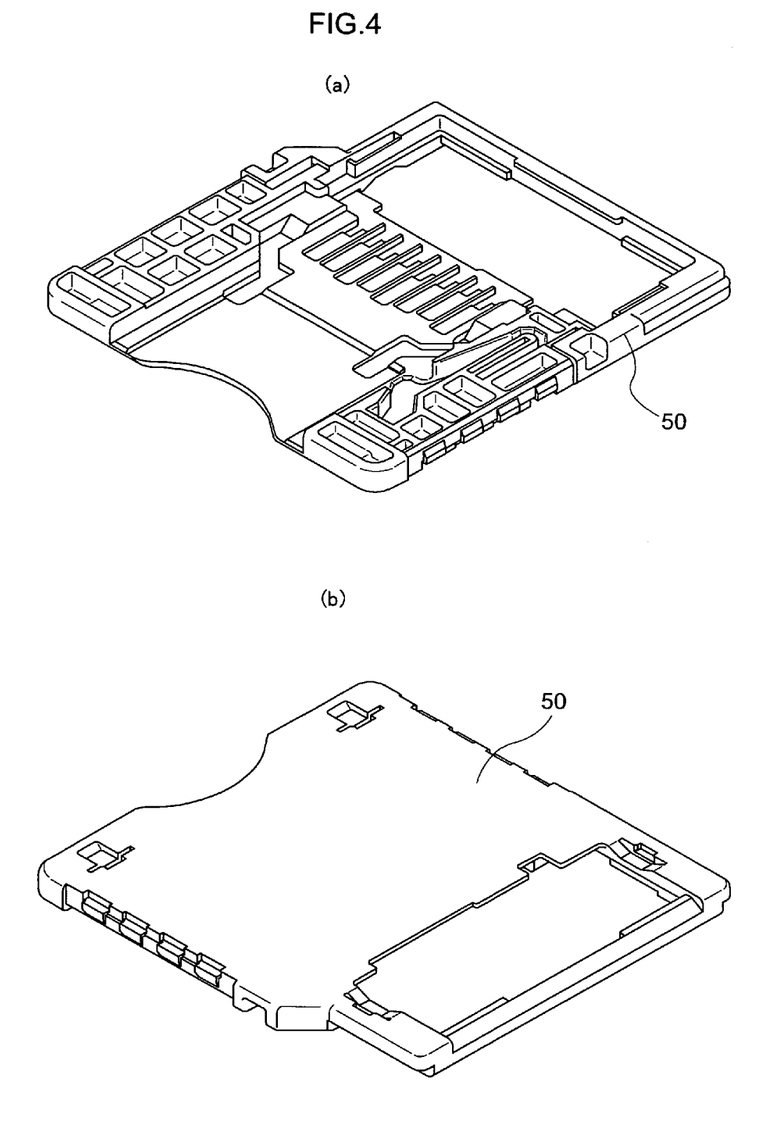
FIGS. 4(a) and 4(b) are perspective views of a main body of the card adapter.

As shown in FIG. 1, the card adapter 100 comprises a main body 50 having an insertion slot 51 formed for inserting the memory card M. Insulating materials, such as resin is molded to form the main body 50, as shown in FIG. 4. Two groups of contact members, the first contact member 10 shown in FIGS. 1 and 5 and the second contact member 20 shown in the FIGS. 1 and 6 are provided within the main body 50 in contrast to the conventional structure with only one group. The first contact member 10 is a group consisting of eight electrodes lined up in the central region of the main body 50 in a width direction. The second member 20 is a group consisting of two contact members which are located at a right and left positions and lined up in a width direction and which are closer to the insertion slot 51 side than the first contact members 10. The card adapter 100 including the first contact member 10 and the second contact member 20 in its main body 50 supports memory cards M comprising two electrode arrays. The memory card M can be connected to any electronic devices without connectors supporting the memory card M by inserting the memory card M to the card adapter 100; therefore, the versatility of the electronic devices is improved.

Figure 5:
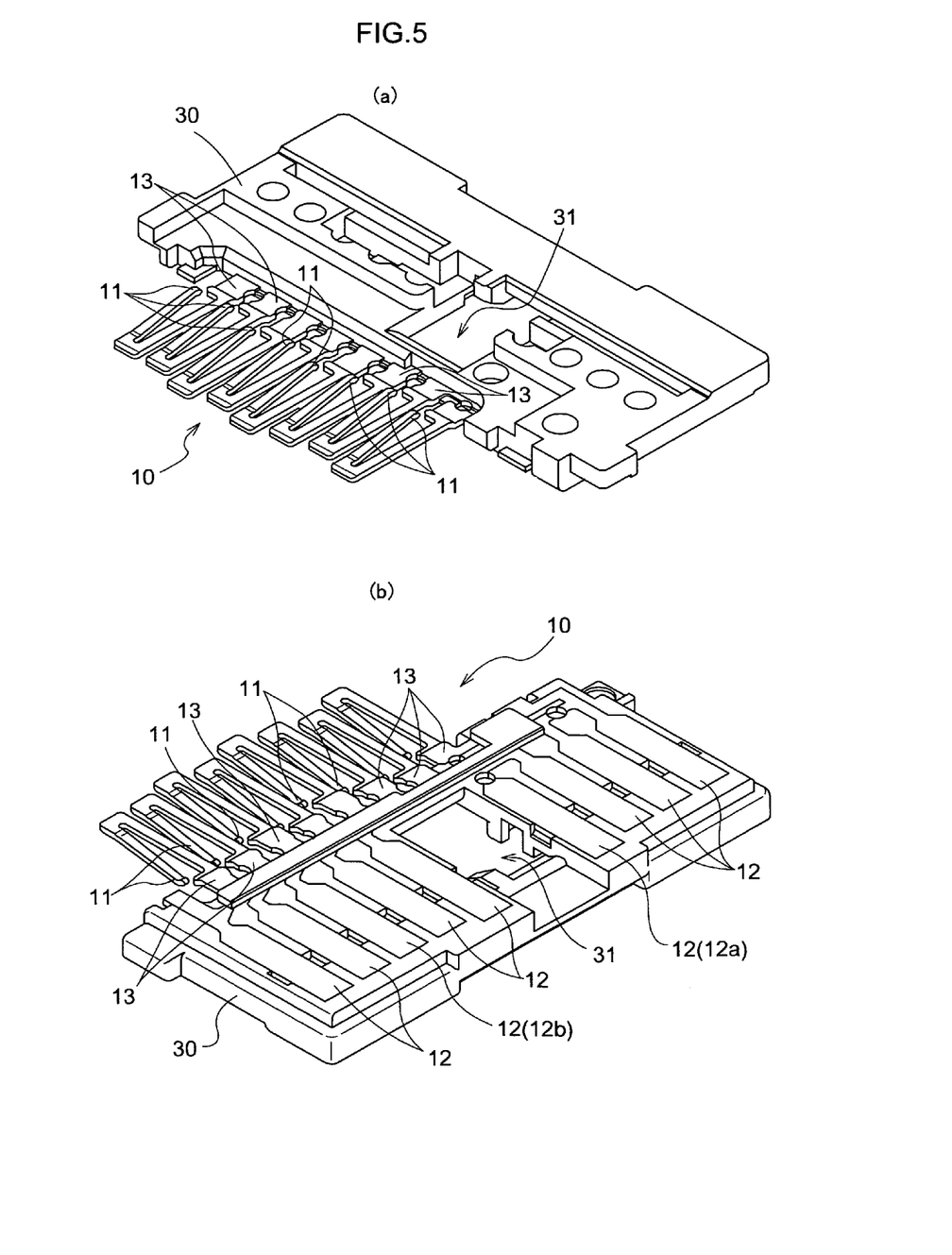
FIGS. 5(a) and 5(b) are perspective views of the first contact member of the card adapter.
Figure 6:
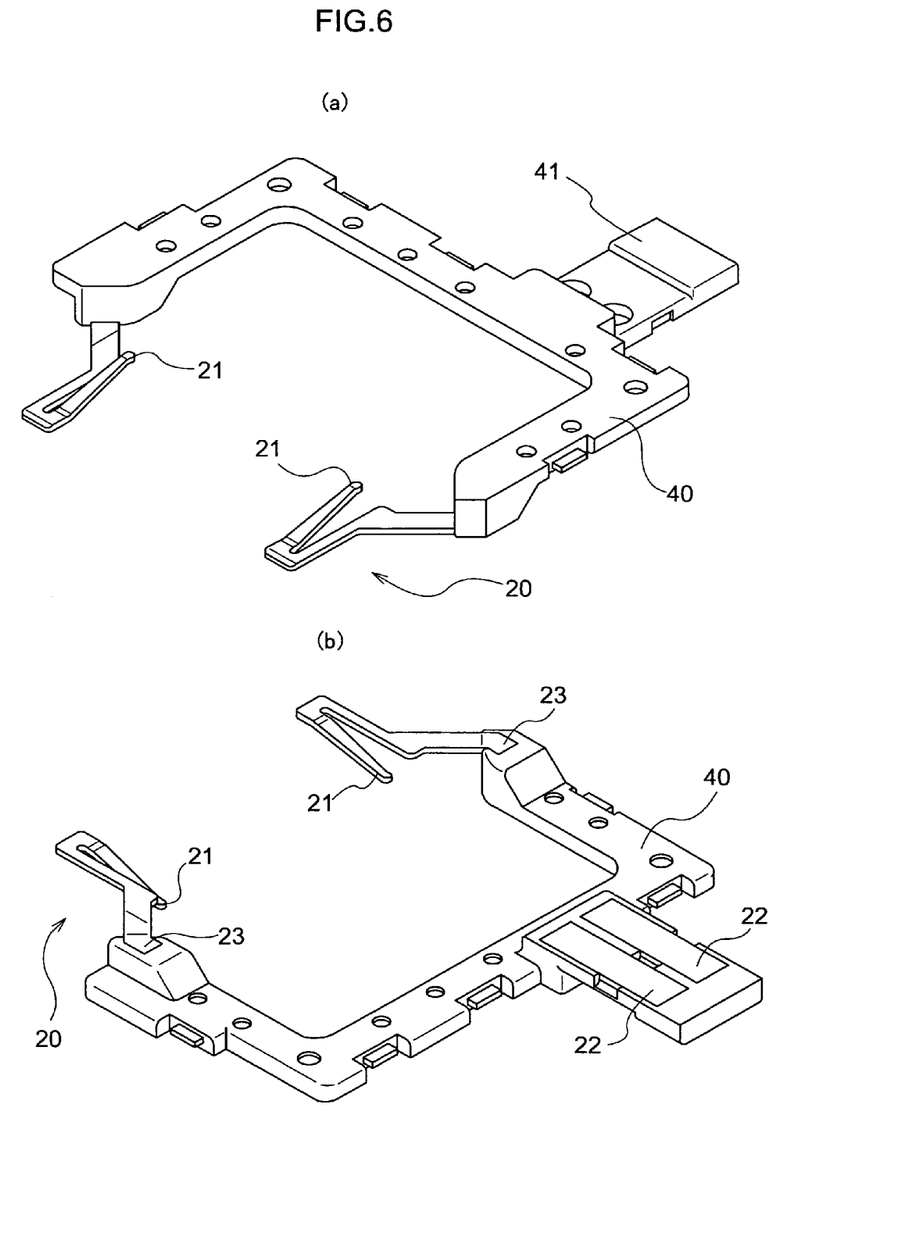
FIGS. 6(a) and 6(b) are perspective views view of the second contact member of the card adapter.

As shown in the FIG. 5, the first contact member 10 comprises the first contact points 11 for contacting the first electrode array M1 of the memory card M and the first connecting portions 12 to be connected to a connector of an electronic device with the base portions 13 located between the first contact points 11 and the first connecting portions 12. The first contact points 11 are formed by bending the end portions of the first contact members 10 which are close to the insertion slot 51 side. The first connecting portions 12 are formed by elongate and plate-like end portions of the first contact member 10 on the side opposite from the insertion slot 51. The base portions 13 are defined as portions of the first contact member 10 other than the first contact points 11 and the first connecting members 12.

As shown in FIG. 6, the second contact member 20 comprises the second contact points 21 for contacting the second electrode array M2 of the memory card M and the second connecting portions 22 to be connected to a connector of an electronic device with the base portions 23 located between the second contact points 21 and the second connecting portions 22. The second contact points 21 are formed by bending the end portions of the second contact member 20 which are close to the insertion slot 51 side. The second connecting portions 22 are formed by elongated and plate-like end portions of the second contact member 20 on the side opposite from the insertion slot 51. The base portions 23 are defined as portions of the second contact member 20 other than the second contact points 21 and the second connecting portions 22.

Figure 2:
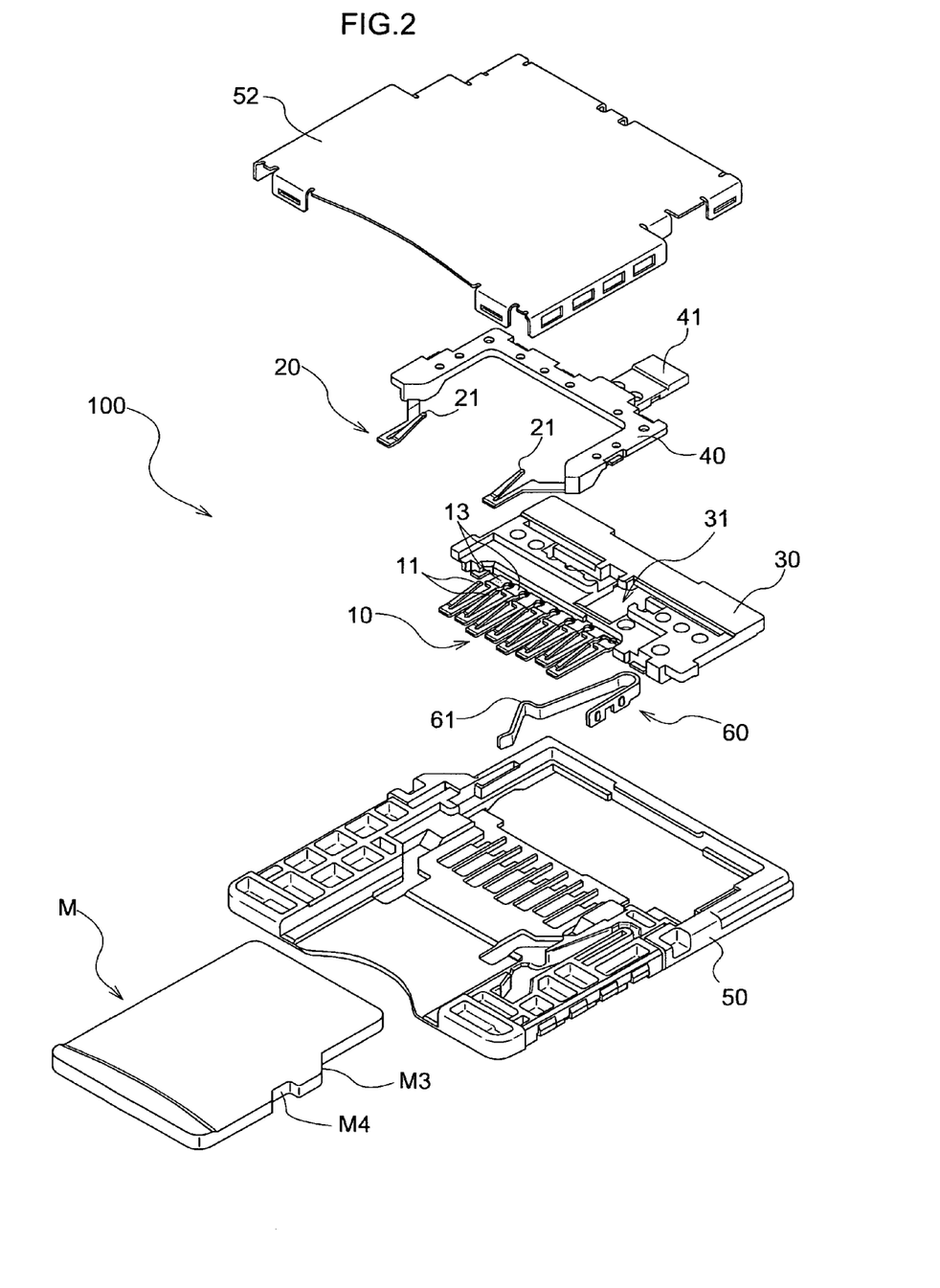
FIG. 2 is an exploded perspective view of the card adapter.
Figure 7:
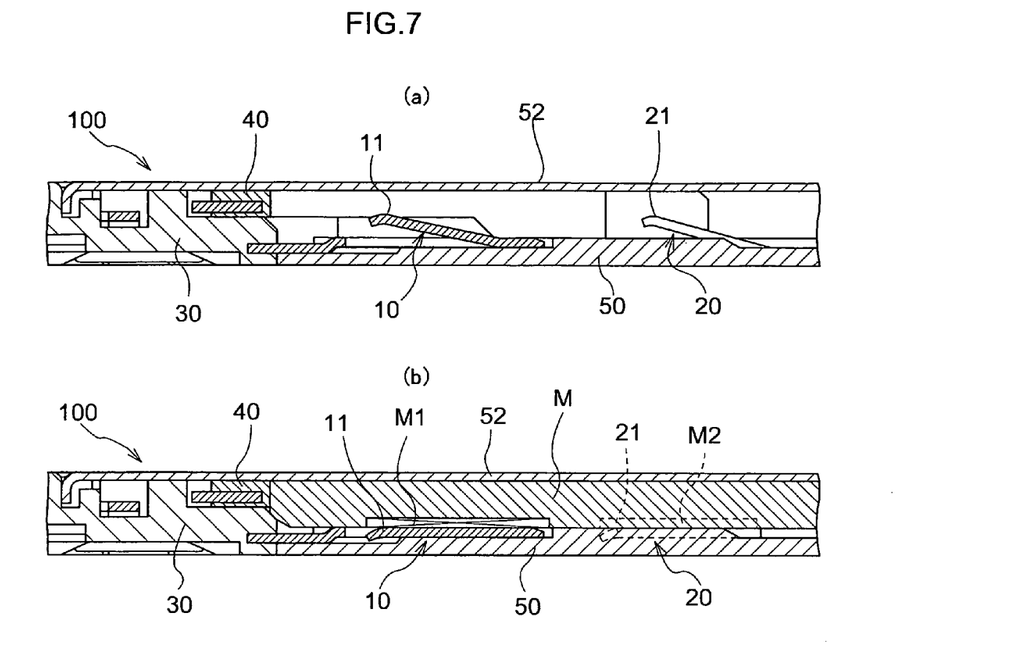
FIGS. 7(a) and 7(b) are cross sectional views of the card adapter with and without the memory card inserted therein.

As can be seen by comparing FIG. 5 with FIG. 6, the base portions 23 of the second contact member 20 are formed to be more elongated than the base portions 13 of the first contact member 10. Therefore, when the first contact member 10 and the second contact member 20 are assembled in order into the main body 50 as shown in FIG. 2, the second contact points 21 are located at positions which are close to the insertion slot 51, and the first contact points 11 are located at positions which are a little distant from the insertion slot 51 as shown in FIGS. 1 (*b*) and 7(*a*). As described above, the first contact points 11 and the second contact points 12 are located at different positions in a direction in which the memory card M is inserted. Therefore, when the memory card M having the first electrode array M1 and the second electrode array M2 is inserted into the insertion slot 51 of the main body 50, the first contact member 10 and the second contact member 20 of the card adapter 100 firmly contact the first electrode array M1 and the second electrode array M2 of the memory card M respectively, as shown in FIG. 7 (*b*). This allows the memory card M to be connected to a connector electrically and physically.

Figure 8:
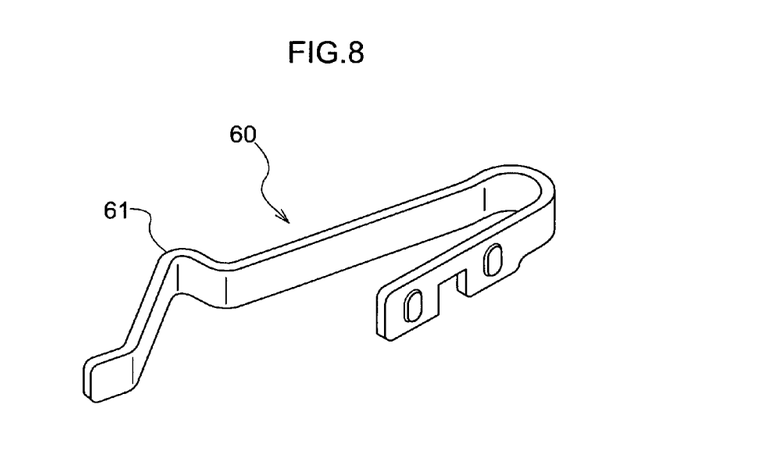
FIG. 8 is a perspective view of a lock spring of the card adapter.

As shown in FIGS. 1 and 8, a lock spring 60 is provided in the card adapter 100 to prevent the inserted memory card M from falling out easily or moving out of place. When the memory card M is inserted into the card adapter 100, at first the shoulder portion M3 of the memory card M contacts the protruding portion 61 of the lock spring 60, and then the protruding portion 61 engages the cut-out portion M4 formed on the side surface of the memory card M at a predetermined insert position. At this time, the memory card M is fixed within the card adapter 100. The memory card M can be removed from the card adapter 100 simply by holding the end portion of the memory card M with fingers, etc. and pulling it out in the direction opposite from the inserting direction.

Figure 9:
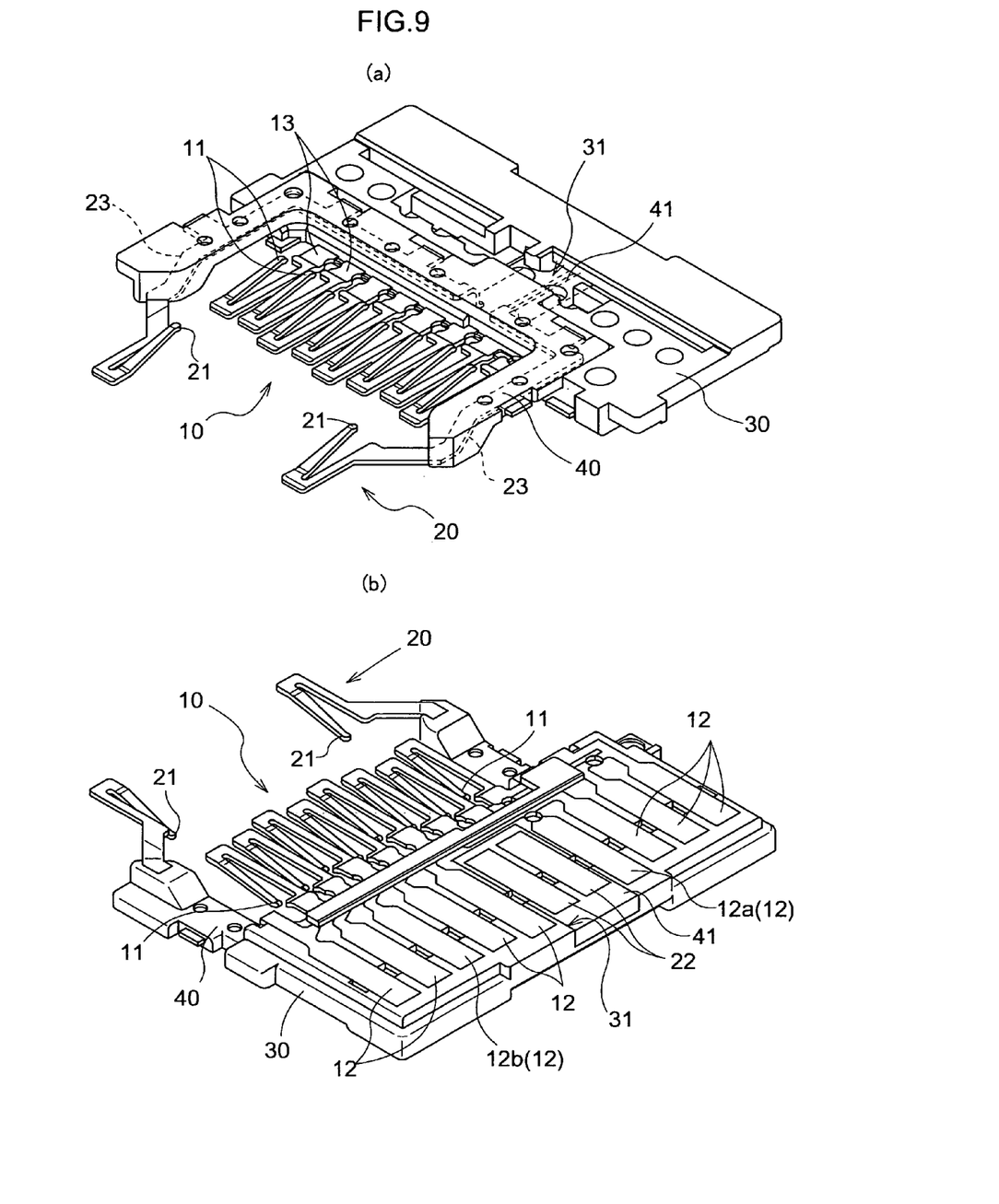
FIGS. 9(a) and 9(b) are perspective views of the first and second contact member when combined.

The base portions 13 of the first contact member 10 and the base portions 23 of the second contact member 20 are located at different positions in a direction of thickness of the main body 50. As shown in FIGS. 1, 2 and 9, in the embodiment, the base portions 23 of the second contact member 20 are arranged to extend across the width of and then along the sides of the base portions 13 of the first contact member 10. This arrangement is effective in locating the first contact points 11 of the first contact member 10 and the second contact points 21 of the second contact member 20 in predetermined positions which correspond to the first electrode array M1 and the second electrode array M2 respectively of the memory card M, and in making the first contact members 10 and the second contact members 20 insulated from each other. Since the base portions 13 of the first contact member 10 and the base portions 23 of the second contact member 20 do not exist in a common flat surface in this arrangement, the two dimensional spread of the two contact members (that is, the total projected area of the first contact member 10 and the second contact member 20) is reduced, and the occupied area of the main body 50 can be reduced. As the base portions 13 of the first contact member 10 and the base portions 23 of the second contact member 20 are located at different positions in the thickness direction, they partially overlap. The base portions 13 of the first contact member 10 and the base portions 23 of the second contact member 20 are much thinner than the main body 50; therefore, the thickness of the card adapter 100 does not increase.

As shown in FIGS. 5 and 6, the first contact member 10 and the second contact member 20 in the embodiment are embedded into the first insulter 30 and the second insulator 40 respectively by insertion molding. The first insulator 30 and the second insulator 40 can be formed from, for example, nonconductive materials, such as resin, glass, etc. The first contact points 11 of the first contact member 10, the first connecting portions 12, the second contact points 21 of the second contact member 20, and the second connecting portions 22 are exposed from the insulator 30 and 40 to keep the conductivity thereof. By embedding the first contact member 10 and the second contact member 20 into the insulators 30 and 40 respectively, the first contact members 10 and the second contact members 20 are insulated more reliably.

The hole portion 31 (see FIG. 5) is formed in the first insulator 30 and the convex portion 41 (see FIG. 6) is formed in the second insulator 40. The size of the hole portion 31 of the first insulator 30 and the convex portion 41 of the second insulator 40 are dimensioned such that the convex portion 41 can fit into the hole portion 31. The first insulator 30 and the second insulator 40 are integrated when the card adapter 100 is manufactured, by a simple assembly of inserting the convex portion 41 to the hole portion 31 as shown in FIGS. 9 (*a*) and (*b*). The rigidity (strength) of parts increases through this integration and the durability of the card adapter 100 is improved. In addition, the toughness of the card adapter 100 is improved as the insulators are less distorted than those which are not integrated. Insulator testing, such as conduction and compression testing can be conducted at once, as the first insulator 30 and the second insulator 40 can be dealt with as one part by integrating them. Thus, the efficiency in manufacturing card adapters 100 can be improved.

With the insulators integrated, as shown in FIG. 9(*b*), the first connecting portions 12 of the first contact member 10 and the second connecting portions 22 of the second contact member 20 are arranged to lie in a common flat surface. This allows the card adapter 100 to which the memory card M is inserted, to be connected to a connector of an electronic device smoothly and reliably.

Figure 10:
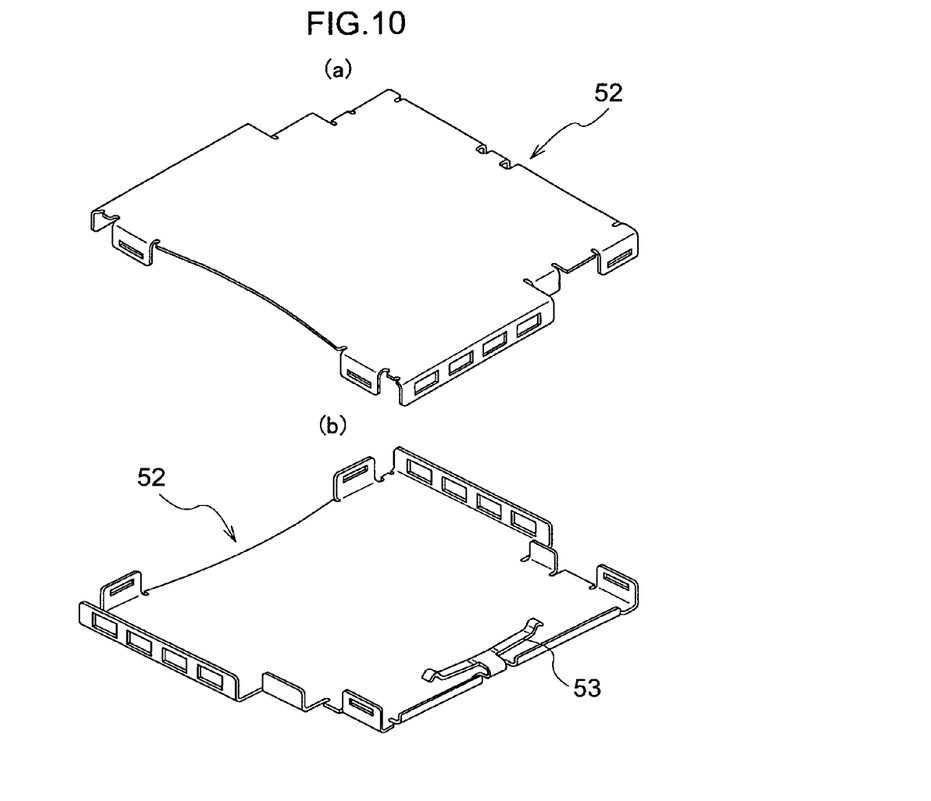
FIGS. 10(a) and 10(b) are perspective views of a metal case of the card adapter.
Figure 11:
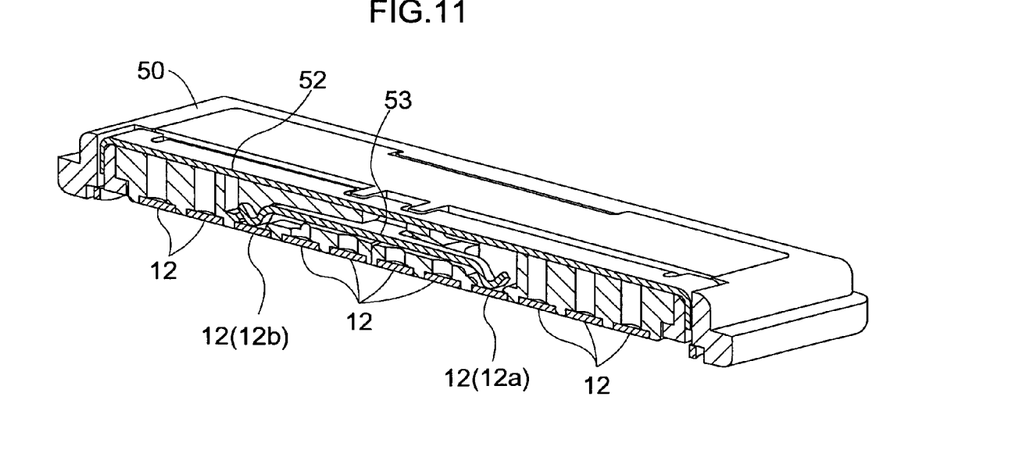
FIG. 11 is a cross-sectional view of around connecting portions of the card adapter with the memory card inserted.

As shown in FIGS. 1 and 2, the main body 50 of the card adapter 100 comprises a metal case 52, in which a ground member 53 is formed by bending a part of the metal plate of the metal case 52, as shown in FIG. 10. With the metal case 52 mounted on the main body 50, as shown in FIG. 11, the ground member 53 contacts ground terminals 12*a* and 12*b* of the first connecting portions 12 of the card adapter 100. Then, the metal case 52 functions as a ground member of the memory card M. There are no floating ground portions in the card adapter 100. Accordingly, the card adapter 100 can not only be made more compact, lightweight and thinner, but also be made simple in appearance.

By providing the main body 50 with the metal case 52, the memory card M is electromagnetically shielded from an electronic device which is on the outside of the card adapter 100. This prevents leakage of electromagnetic waves from the memory card M. The metal case 52 is effective in suppressing unnecessary electromagnetic radiation, particularly when providing the memory card M with wireless communication function, etc. Since the metal case 52 shields external electromagnetic waves, the influence of the external electromagnetic waves on the memory card M is reduced.

The invention claimed is:

1. A card adapter for connecting a memory card (M) having the first electrode array (M1) and the second electrode array (M2) to a connector for memory cards which are different from the memory card (M) comprising:

a main body (50) having an insertion slot (51) into which the memory card (M) is inserted;

a first contact member (10) comprising first contact points (11) for contacting the first electrode array (M1) and first connecting portions (12) to be connected to the connector with base portions (13) disposed between the first contact points (11) and the first connecting portions (12); and, a second contact member (20) comprising second contact points (21) for contacting the second electrode array (M2) and second connecting portions (22) to be connected to the connector with base portions (23) disposed between the second contact points (21) and the second connecting portions (22);

the first contact member (10) and the second contact member (20) being arranged within the main body (50) in such a way that the first contact points (11) and the second contact points (21) are located at different positions in a direction in which the memory card is inserted.

2. The card adapter according to claim 1, wherein the base portions (13) of the first contact member (10) and the base portions (23) of the second contact member (20) are located at different positions in a direction of thickness of the main body (50).

3. The card adapter according to claim 1, wherein the first contact member (10) and the second contact member (20) are embedded into the first insulator (30) and the second insulator (40) respectively by insertion molding, and the first insulator (30) and the second insulator (40) are assembled to be integrated.

4. The card adapter according to claim 3, wherein a convex portion (41) formed in the second insulator (40) is fit into a hole portion (31) formed in the first insulator (30) to integrate the first insulator (30) and the second insulator (40) wherein the first connecting portions (12) and the second connecting portions (22) lie in a common flat surface.

5. The card adapter of the claim 1, wherein the main body (50) comprises a metal case (52), which functions as a ground member of the memory card (M).

\* \* \* \* \*